(12) United States Patent
Diserens

(10) Patent No.: US 6,579,344 B1
(45) Date of Patent: Jun. 17, 2003

(54) METHOD FOR LASER CUTTING

(75) Inventor: Pierre Diserens, Etoy (CH)

(73) Assignee: Pierre-Yves Diserens, Lussy S/ Morges (CH)

( * ) Notice: Subject to any disclaimer, the term of this patent is extended or adjusted under 35 U.S.C. 154(b) by 0 days.

(21) Appl. No.: 10/030,218

(22) PCT Filed: Jul. 7, 2000

(86) PCT No.: PCT/EP00/06473

§ 371 (c)(1),
(2), (4) Date: Jan. 3, 2002

(87) PCT Pub. No.: WO01/03877

PCT Pub. Date: Jan. 18, 2001

(51) Int. Cl.$^7$ .......................... B01D 53/04; B01D 53/22
(52) U.S. Cl. .................... 95/54; 95/51; 95/52; 95/117; 95/138; 423/219
(58) Field of Search ................ 95/45, 51, 52, 95/54, 117, 138; 423/219

(56) References Cited

U.S. PATENT DOCUMENTS

| | | | | |
|---|---|---|---|---|
| 4,861,361 A | * | 8/1989 | Jain et al. ................. | 62/18 |
| 4,894,068 A | * | 1/1990 | Rice ......................... | 55/16 |
| 5,102,432 A | * | 4/1992 | Prasad ...................... | 55/16 |
| 5,169,412 A | * | 12/1992 | Prasad et al. ............. | 55/16 |
| 5,185,014 A | * | 2/1993 | Prasad ...................... | 55/16 |
| 5,383,957 A | | 1/1995 | Barbe et al. | |
| 5,388,413 A | * | 2/1995 | Major et al. ............... | 62/11 |
| 5,429,662 A | * | 7/1995 | Fillet ........................ | 95/14 |
| 5,492,682 A | * | 2/1996 | Succi et al. ............... | 423/219 X |
| 5,582,030 A | * | 12/1996 | Dannohl .................... | 95/54 X |
| 5,588,984 A | * | 12/1996 | Verini ....................... | 95/15 |
| 5,607,572 A | * | 3/1997 | Joshi ........................ | 95/138 X |
| 5,649,995 A | * | 7/1997 | Gast, Jr. ................... | 95/12 |
| 5,688,306 A | * | 11/1997 | Verini ....................... | 95/15 |
| 5,730,780 A | * | 3/1998 | Booth, III ................. | 95/51 |
| 5,763,855 A | | 6/1998 | Shioji | |
| 5,827,351 A | * | 10/1998 | Prasad et al. ............. | 95/45 |
| 5,829,272 A | * | 11/1998 | Barry ....................... | 95/54 X |
| 5,993,760 A | * | 11/1999 | Hsiung et al. ............ | 423/210 |

FOREIGN PATENT DOCUMENTS

| | | |
|---|---|---|
| EP | 0 586 018 A | 3/1994 |
| WO | WO 95/33594 A | 12/1995 |

* cited by examiner

Primary Examiner—Robert H. Spitzer
(74) Attorney, Agent, or Firm—John Moetteli; Bugnion S.A.

(57) ABSTRACT

The method provides technical nitrogen instead of pure nitrogen in liquid form which has to be heated to be brought in gaseous form for laser cutting. Atmospheric air is compressed and driven through a cascade of high density bundles of hollow membrane fibers to permeate oxygen and air's component gases and yield technical nitrogen, and the pressure of the technical nitrogen is boosted to feed the laser cutting equipment. The method thus improves the laser cutting so as to avoid the drawbacks resulting from use of nitrogen in liquid form obtained by the cryogenic process by using technical nitrogen obtained via the aforesaid hollow fiber membrane technology in an efficient and cost effective manner.

7 Claims, No Drawings

METHOD FOR LASER CUTTING

BACKGROUND OF THE INVENTION

This invention relates to a method for laser cutting wherein nitrogen is used to avoid oxidation of the metal during passage of the laser beam.

Laser cutting is state of the art for cutting of thick or thin metal parts according to most diverse geometries. As sublimation of the metal occurs at various temperatures over and under the part being cut, the laser beam is confined by means of pure nitrogen which acts as a cutting gas to prevent fusion of the metal which would allow alloy of air molecules to the metal.

Pure nitrogen is obtained by a cryogenic process and supplied in liquid form. The liquid nitrogen is therefore heated to be brought in gaseous form to feed the laser cutting equipment at a pressure about 25 bar and at a rate of 50 $m^3$/hour or a multiple thereof depending on the number of laser beams of the cutting machine.

The use of pure nitrogen in liquid form is very expensive due to the cryogenic process. Handling thereof is also expensive because it requires heavy containers to withstand a pressure of approximately 30 bar during storage and transit. Furthermore, heater equipment is needed to heat the liquid nitrogen to bring it in gaseous form to feed the cutting machine. All these operations require precautions and safety measures in terms of personnel and equipment and they are energy consuming, which further raises the cost of laser cutting.

In the mid-1980's, based on the varying rates of permeation of air's component gases, a hollow fiber membrane technology was developed to generate technical nitrogen, i.e., gaseous nitrogen up to about 99,9% pure. According to this technology, compressed air passes through a high density bundle of hollow membrane fibers whereby the relatively fast gases present in the air—oxygen, carbon dioxide and water vapor—diffuse through the semi-permeable membrane surface, leaving behind a stream of high purity gaseous nitrogen. The operational performance of the system is determined by a number of factors. For example, the flow rate of nitrogen produced by the membrane fibers varies inversely with the nitrogen purity required. The nitrogen flow rate is directly related to the air supply pressure. Further, the nitrogen flow increases as the temperature of the feed air increases. The membrane fibers are engineered into modules available in an array of sizes and capacities, and the system is an advantageous source of nitrogen when liquid nitrogen supplies are impractical, unreliable and cost-prohibitive.

U.S. Pat. No. 5,763,855, the content of which is incorporated herein by reference thereto, discloses a method for laser cutting wherein nitrogen is used to avoid oxidation of the metal during passage of the laser beam, comprising the steps of providing an atmospheric air supply; compressing said atmospheric air; driving said compressed atmospheric air through a first density bundle of hollow membrane fibers to permeate oxygen and air's component gases through said hollow membrane fibers and yield technical nitrogen at a first purity at the end of said first high density bundle of hollow membrane fibers; and collecting said technical nitrogen at the end of said first high density bundle of hollow membrane fibers.

U.S. Pat. No. 5,383,957, the content of which is incorporated herein by reference thereto, discloses a multistage membrane system for the production of high purity gases.

What is needed therefore is a means to improve the laser cutting by a method which avoids the drawbacks resulting from use of nitrogen in liquid form obtained by the cryogenic process by using technical nitrogen obtained via the aforesaid hollow fiber membrane technology in an efficient and cost effective manner.

SUMMARY OF THE INVENTION

The method provides technical nitrogen instead of pure nitrogen in liquid form which has to be heated to be brought in gaseous form for laser cutting. Atmospheric air is compressed and driven through a cascade of high density bundles of hollow membrane fibers to permeate oxygen and air's component gases and yield technical nitrogen, and the pressure of said technical nitrogen is boosted to feed the laser cutting equipment. The method thus improves the laser cutting so as to avoid the drawbacks resulting from use of nitrogen in liquid form obtained by the cryogenic process by using technical nitrogen obtained via the aforesaid hollow fiber membrane technology in an efficient and cost effective manner.

DETAILED DESCRIPTION OF THE PREFERRED EMBODIMENT(S)

The method of the invention provides technical nitrogen instead of pure nitrogen in liquid form which has to be heated to be brought in gaseous form for laser cutting. Atmospheric air is compressed and driven through a cascade of high density bundles of hollow membrane fibers to permeate oxygen and air's component gases and yield technical nitrogen, and the pressure of said technical nitrogen is boosted to feed the laser cutting equipment.

The invention is a method for laser cutting wherein nitrogen is used to avoid oxidation of the metal during passage of the laser beam. The method includes the steps of providing an atmospheric air supply, compressing said atmospheric air, driving said compressed atmospheric air through a first high density bundle of hollow membrane fibers to permeate oxygen and air's component gases through said hollow membrane fibers and yield technical nitrogen at a first purity at the end of said first high density bundle of hollow membrane fibers, collecting said technical nitrogen at the end of said first high density bundle of hollow membrane fibers, driving said technical nitrogen through at least a second high density bundle of hollow membrane fibers to further permeate oxygen and air's component gases remaining in said technical nitrogen and yield technical nitrogen at a second purity higher than said first purity, collecting said technical nitrogen at the end of said second high density bundle of hollow membrane fibers, driving the technical nitrogen through a catalyst comprising Fe and Ni at a temperature of about 380°, boosting the pressure of said technical nitrogen, cooling the technical nitrogen and feeding said boosted pressure technical nitrogen to a laser cutting equipment.

Accordingly, by its cascade, catalysis and pressure boosting effects the method allows feeding the laser cutting equipment with high purity technical nitrogen at a cost considerably lower than that of pure nitrogen in liquid form. There is a low pressure difference between air input and nitrogen yield and the aggregate output is high. Flow rate and purity of the technical nitrogen may be selected at will to feed the cutting equipment at the lowest cost. The air supply is easy and cheap; it does not have to be heated to increase the nitrogen flow. The modules incorporating the bundles of hollow membrane fibers may have a reduced size which facilitates manufacture and installation thereof in conjunction with the laser cutting machinery. The number of modules incorporating the bundles of hollow membrane fibers in the cascade may be selected at will. Catalysis allows the remaining particles of oxygen oxidize the iron (Fe) and they are completely destructed. The production of the technical nitrogen is made in situ and there are no storage, transit, or safety cost raising problems.

Advantageously, a further step is to filter the technical nitrogen through adsorbing coal before boosting the pressure thereof in order to modulate at will the value of the second purity, the flow rate and the purity of the technical nitrogen fed to the laser equipment.

Preferably, filtering of the technical nitrogen through adsorbing coal is made selectively via two vats in parallel, one of which is desorbed while the other adsorbs, whereby the adsorbing/desorbing procedure is continuous. Still preferably, the vats are respectively desorbed by a vacuum caused to the atmospheric air supply by the compression thereof, whereby mechanical components are limited. The gases resulting from desorbtion may be redirected to the atmospheric air supply for compression therewith.

Typically, the method allows feeding the laser equipment with technical nitrogen pure up to 99.5% to 99.99%.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A method for laser cutting wherein nitrogen is used to avoid oxidation of the metal during passage of the laser beam, comprising the steps of:
    (a) providing an atmospheric air supply supplying atmospheric air;
    (b) compressing said atmospheric air resulting in said atmospheric air becoming compressed air;
    (c) driving said compressed air through a first high density bundle of hollow membrane fibers to permeate oxygen and air's component gases through said hollow membrane fibers and yield technical nitrogen at a first purity at the end of said first high density bundle of hollow membrane fibers;
    (d) collecting said technical nitrogen at the end of said first high density bundle of hollow membrane fibers; wherein further comprising the steps of:
        a. driving said technical nitrogen through at least a second high density bundle of hollow membrane fibers to further permeate oxygen and air's component gases remaining in said technical nitrogen and yield technical nitrogen at a second purity higher than said first purity;
        b. collecting said technical nitrogen at the end of said second high density bundle of hollow membrane fibers;
        c. driving the technical nitrogen through a catalyst comprising Fe and Ni at a temperature of about 380° C.;
        d. boosting the pressure of said technical nitrogen resulting in said technical nitrogen becoming boosted pressure technical nitrogen; and,
        e. cooling the technical nitrogen and,
        f. feeding said boosted pressure technical nitrogen to a laser cutting equipment.

2. A method according to claim 1, further comprising the step of filtering the technical nitrogen through adsorbing coal before boosting the pressure thereof.

3. A method according to claim 2, wherein filtering of the technical nitrogen through adsorbing coal is made selectively via two vats in parallel one of which is desorbed while the other adsorbs.

4. A method according to claim 3, wherein the vats are respectively desorbed by a vacuum caused to the atmospheric air supply by the compression thereof.

5. A method according to claim 4, wherein gases resulting from desorbtion are redirected to the atmospheric air supply for compression therewith.

6. A method according to claim 3, wherein gases resulting from desorbtion are redirected to the atmospheric air supply for compression therewith.

7. A method according to claim 1, wherein the pressure boosted technical nitrogen is cooled to a temperature comprised between −10° and −40° C.

* * * * *